United States Patent Office 2,895,929
Patented July 21, 1959

2,895,929

POLYMERIZABLE EPOXIDE GROUP-CONTAINING MODIFIED ALKYD RESINS

Milton Yusem, Chicago, Ill., assignor to Bradley & Vrooman Company, a corporation of Illinois No Drawing. Application May 9, 1955
Serial No. 507,135

18 Claims. (Cl. 260—21)

This invention relates to the production of new and useful polymerizable resinous compositions having desirable and characteristic properties to make them especially suitable for use in the paint, textile, electrical and laminating arms as well as in other allied arts. The compositions of the present invention are useful in molding, electrically insulating, adhesive and laminating and coating applications. Additionally the compositions may be modified to impart desirable properties to special purpose coating compositions, such as fire-retardant compositions, pigment paste compositions, thermally hardened porous or intumesced insulating compositions and thermosetting compositions in granular insoluble form having desirable ion exchange properties. The invention also includes within its scope new formulating methods by means of which new and useful synthetic resinous compositions are produced.

More particularly this invention is concerned with new and useful resinous dispersions or mixtures containing:

(1) A polymerizable polyether polyepoxide oil modified alkyd resin prepared by the dehydrohalogenation of an epihalohydrin ether addition product of a short to medium oil modified alkyd resin having from 8 to 20 carbon atoms in the fatty acid molecule, an acid number below 60, and sufficient free hydroxyl groups to provide about ½ to 2½ epoxy groups in each molecule of said epihalohydrin ether, the hydroxyl groups which are substituted with epoxy groups being adapted to cross-link in the presence of an epoxy cross-linking agent and (2) A polymerizable compound which forms mixed or copolymers with (1), which compound contains one or more $CH_2=C=$ grouping, such as styrene, divinyl benzene, diallyl phthalate, glycidyl methacrylate, vinyl acetate, diallyl cyanamide, alkyl acrylates, methyl methacrylate, N-vinyl N-alkyl guanidine, glycol dimethacrylate, diallyl maleate, diallyl fumarate, diallyl succinate, allyl isocyanate, triallyl phosphate, tetra allylsilane, tetra allyl titanate and tetra allylsilicates.

Although linear polyesters (fusible alkyd resins) of dihydric alcohols and ethylenically unsaturated dicarboxylic acids in which the carboxylic groups are linked to one or both of the ethylenic carbon atom are known to copolymerize with ethylenically unsaturated monomers, by heating in the presence of a peroxide catalyst, these compositions tend to gel even in the absence of polymerization catalysts at room temperature and seriously interfere with the intended use for coating, casting or laminating. Suggestions to inhibit premature setting by incorporating alpha cellulose fillers has too severely restricted the use of these compositions and undesirable properties are imparted to the cured resin by the filler.

The use of inhibitors, such as hydroquinones or amines, has been suggested but these are objectionable because they unduly slow the curing reaction, usually necessitate higher curing temperatures, frequently discolor the cast or coated product, display a tendency to crack or break in large castings and because they introduce an additional parasitic component which confers no useful structural property to the resin other than to prevent deterioration of certain of the ingredients.

Attempts have been made to solve these difficulties through appropriate selection and proportioning of the polymerizable ingredients but these selected formulations still require the use of stabilizers in order to meet the widely varying conditions met in commercial application and further the selected formulations have had the added disadvantage of being substantially incompatible with certain desirable resinous additives which impart special properties to the cured finished composition, such as hydrophobic additives, the silanes and siloxane resins, tackifying additives, such as certain of the liquid and low melting epoxy resins known as Epon resins and sold by Shell Chemical Company, or the titanate alkyl esters, or gloss enhancing agents, such as rosin, chemically modified rosins, such as ester gum, maleinized gum, unsaturated fatty oils, etc., or gloss reducing agents, such as very finely divided butadiene-styrene polymer particles, butadiene-acrylonitrile polymers, or certain plastisols, such as the vinyl chloride and vinyl chloro-acetate particle suspensions in non-volatile liquid plasticizers.

The present invention not only improves the stabilization of the liquid dispersions to obviate the need for any non-contributing stabilizers, but also widens the compatibility of the resinous products with desirable special additives of the type above mentioned by utilizing an entirely novel polymerizable epoxy oil modified alkyd for conjoint polymerization with the ethylenically unsaturated comonomer to produce new and very desirable results. It is unexpected that the alkyd modification with oil should display such improved compatability since the usual commercial epoxy resins are for all practical purposes incompatible with alkyd resins.

Further, it is surprising that compatibility with relatively substantial amounts of drying, semi-drying and non-drying oils is obtained in view of the difficulty of incorporating this material in many of the usual synthetic vinyl type resins. Through the addition of still other resin materials, such as nitrocellulose or methacrylates for example, such properties as hardness and transparency may be improved and the usefulness of the basic resin mixture, polymerized at the locus where the particular mechanical, physical and chemical resistance properties are required, is widely extended.

Because of the introduction of the epoxy group into the oil modified alkyd resin molecule, a new chemical means of improving the curing and setting of the resin, particularly in the form of a film, is achieved, namely, through additional cross-linking of the epoxy groups to form three dimensional molecular networks without the disadvantage of the evolution of water of condensation. Further by blocking the hydroxyl function of the oil modified alkyd resin, the stability of the alkyd resin is remarkably improved, particularly with respect to such physical agencies as heat, light, oxygen, etc., and the resistance of the resin towards water is improved.

It is preferred that the alkyd resin be modified with a fatty acid having from 8 to 20 carbon atoms in the fatty acid molecule, and the amount of fatty acid employed in reaction with the polycarboxylic acid and polyhydric alcohol is limited to assure sufficient free hydroxyl groups which will permit the reaction with the epihalohydrin to provide about ½ to 2½ epoxy groups in each molecule of the polyhalohydrin ether recovered as the addition product in the first step of the process. In this manner the hydroxyl groups of the oil modified alkyd resin, after dehydrohalogenation, are converted from a structural point of weakness in the resin molecule, into reactive epoxy groups which cross-link to form superior resinous products in the presence of known catalysts.

The epoxide products resulting from the dehydrohalogenation of the polyhalohydrin ether of the oil modified alkyd resin, are characterized by the presence of epoxide groups, cyclic ether groups, wherein an ether oxygen atom is attached to two adjacent carbon atoms forming the cyclic structure, and at least two of said epoxide groups being linked in an ether linkage to a hydroxyl group in said alkyd resin molecule, thereby forming an oil modified alkyd ether epoxide, and this latter term as used herein identifies the products of the invention.

The polyhalohydrin ethers are halogen compounds in a restricted sense, i.e. of chlorine, bromine and iodine or those compounds which may contain in addition non-reactive fluorine and which result from the condensation of the oil modified alkyd resin and ½ to 2½ moles of the epihalohydrin. The epihalohydrin is preferably an alpha or 1,2 epihalohydrin, and produces a polyhalohydrin ether containing a non-cyclic ether linkage, a carbinol group and a halogen atom attached to a carbon atom adjacent to the carbinol group.

Upon treatment with a dehydrohalogenating agent, such as sodium aluminate, the halogen attached to the carbon atom adjacent to the carbinol group is removed and the hydroxyl of the adjacent carbinol atom is converted into the epoxide group.

The preferred polyether polyepoxide oil modified alkyd resin is a short oil modified resin. Exemplified with phthalic acid anhydride as the polycarboxylic acid, the resin contains from 40 to 50% of phthalic acid anhydride, and has a ratio of about 5 moles phthalic acid anhydride to 4 moles of glycerol to 2 moles of fatty acid. When the ratio becomes 1 mole phthalic acid anhydride to 1 mole glycerol to 1 mole fatty acid, the alkyd is a medium oil alkyd, range 30 to 40% phthalic acid anhydride and there are no longer free hydroxyl groups for reaction with epichlorhydrin.

The unmodified alkyd from phthalic acid anhydride and glycerol contains 2 hydroxyl groups for reaction with epichlorhydrin, but here the distinction in accordance with the invention is that the invention uses fatty acid in addition to phthalic acid anhydride and glycerol.

The unmodified alkyd from phthalic acid anhydride and glycerol is hard and brittle. The unmodified alkyd from maleic anhydride and ethylene glycol has undesirable gelling properties and is frequently too soft even in the converted stage to provide desirable products in the copolymerized mixture. The alkyd resin without modifiers from phthalic acid anhydride and glycerol is heat convertible to an insoluble, infusible stage but in this final stage has poor solubility in the usual hydrocarbon solvents. The 2:3 condensation reaction is difficult to control since the resin gels very rapidly and the product may contain large amounts of unreacted polyhydric alcohol and unreacted acid anhydride which renders the product sensitive to moisture, reactive with basic pigments and difficult to use. In the unmodified state, this alkyd is unsuitable for organic finishes.

As compared with the phenolic varnishes, the resin portion of the molecule in the alkyd resin is tougher and more durable than the resin portion of the oil modified phenolic resin. Products of superior toughness and durability are obtained by modifying the alkyd resins with a smaller amount of oil than is required in the oil modification of the phenolic resins. A greater improvement in compatibility with other resins is obtained with a shorter oil modification of the alkyd resins than is achieved in the oil modification of phenolic resins. Although the most difficult alkyd resin to prepare is the short oil alkyd in the phthalic acid anhydride-glycerol-fatty acid group, techniques are now available to control the substituted amount and purity of the product to produce a highly satisfactory starting material for the invention.

The short oil alkyd resin reaches the gelation stage quite rapidly, more so than the medium and long oil lengths. This requires then a larger excess of glycerol in order to insure that a low acid number is produced in the finished product. Although for certain very special purposes, high acid number alkyds have been used and are mentioned in the patent literature, it appears essential that the acid number be low, preferably less than 50, in the product of the present invention. Otherwise the resin tends to react with basic pigments and the water resistance becomes poor. The acid number when high causes serious difficulties in increasing viscosity and prevents complete reaction. It defeats reproducibility in processing. Insofar as the epoxy reaction is concerned, the carboxyl group is reactive with epoxy to a certain degree which introduces an undesirable feature. Further, the high acid number alkyds have poorer drying properties and inferior exterior durability.

One of the most important properties of alkyds from phthalic acid anhydride is the excellent stability to heat and resistance to decomposition by ultra-violet radiation. This property is not shared by alkyd resins from aliphatic acids. For the coating use, the alkyd from phthalic acid anhydride is superior to the straight alkyd resin from the aliphatic polycarboxylic acids. This superiority is carried over to the oil modified alkyds which are converted into polyether polyepoxides and polymerized with vinyl or allyl monomers in accordance with the invention.

The fatty acids used for modifying by esterifying the alkyd resin include saturated and unsaturated acids derived from drying, semi-drying and non-drying oils, such as vegetable oils and oils obtained from marine products. The unsaturated acids include those derived from fish oils, e.g., clupanodonic acid and those derived from cottonseed oil, linseed oil, china-wood oil, oiticica oil, soy bean oil, corn oil and other unsaturated vegetable oils. The unsaturated acids may include one or more of the following: arachidic acid, behenic acid, lignoceric acid, tall oil fatty acids, lauroleic acid, myristoleic acid, gadoleic acid, erucic acid, linoleic acid, oleic acid, linolenic acid, elaeostearic acid, licanic acid, arachidonic acid, etc. The saturated acids include lauric acid, myristic acid, palmitic acid and stearic acid. Hydroxy acids such as ricinoleic acid are very valuable modifiers for the alkyd epoxy polyether product, since they introduced an additional site of epoxy cross-linking function on the fatty acid chain in the oil modified epoxy alkyd product.

The modified alkyd resin may include polyesters such as the "reactive polyesters" based on linear alkyd resins (maleic or fumaric acid) with a reactive vinyl or allyl monomer, phthalic acid anhydride alkyd resins, carbic anhydride alkyd resins, petrex alkyd resins, citric alkyd resins, aconitic alkyd resins, tricarballylic alkyd resins, tetrachlorophthalic anhydride alkyd resins (fire resistance), the alkyd resin from linoleic dimer acid, the alkyd resin from the addition product of 1-pimaric and maleic anhydride, etc.

The alcohols may be glycol, diethylene glycol, propylene glycol, trimethylol propane, pentaerythritol, dipentaerythritol, sorbitol, mannitol, etc.

When aliphatic polycarboxylic acids are used in contrast with phthalic acid anhydride, the flexibility of the resin is increased. The resin from phthalic acid anhydride is harder and more brittle and is more highly cross-linked. One might say that the phthalic acid anhydride product is more like glass whereas the product from the dibasic acids, succinic through sebacic, maleic and fumaric are more like rubber.

In general, non-drying oils act as permanent plasticizers whereas oxidizing oils tend to harden on aging unlike the non-drying oils. The compatibility of the oil modified alkyd polyether epoxide with oil increases with increasing oil length but there is no need to reduce phthalic acid anhydride below about 23% since this long oil or medium-to-long oil alkyd blends well with oil by mere mixing. The epoxide alkyds which are shorter in oil than 38% phthalic acid anhydride generally require aromatic solvents (xylol) for solubilization whereas with the product containing from 35% to 39% minimum phthalic acid anhydride content, the solvent may be mineral spirits. The percentage of resin solids in solution may be 50% for medium oil and 50% for short oily in xylol and/or hydrocarbon but generally the short oil epoxy alkyd resin and conjoint vinyl or allyl polymer in a hydrocarbon solution of the same alkyd resin concentration is more viscous than the medium oil modification of this alkyd resin.

In industrial coatings which are force dried or baked at elevated temperatures, non-drying oils and semi-drying oils are preferred modifiers due to their improved color, superior film forming properties, improved plasticizing function imparting greater flexibility to the film, and improved resistance against deterioration by oxygen, ultraviolet light and water.

Surprisingly, comparison between a short oil lauric acid modified alkyl component (phthalic acid anhydride) and this same alkyd modified to form the new epoxy polyether of the invention, discloses that the conventional alkyd is so slow drying, so soft and has such poor film forming properties that it cannot be satisfactorily used as the principal film forming resin ingredient whereas the epoxy polyether forms an excellent film through the cross-linking reaction in the presence of an epoxy cross-linking catalyst.

In architectural finishes, the oil modifier for the epoxy polyether alkyd resin of the invention may desirably be an unsaturated oil or a treated oil, such as styrenated oils, copolymer oils, synthetic oils or the like, but it is preferred that a minor amount of the modified oil (heat treated, blown, dimerized, etc.) be employed in lieu of the unsaturated oil or acid which is replaced by said minor amount. It is desirable to produce products which are not too viscous in an organic solvent solution, which are uniform and of high resin concentration and which overcome the prior art difficulties of wrinkling, checking and shrinkage due to the action of oxygen and peroxides in the aging of the film.

Tung oil, for example, provides improved hardness and durability and permits controlled after-hardening of the film in the presence of metallic driers. Tung oil improves water and alkali resistance but the color is darker and processing is a little more difficult. Because of the reactivity of the tung oil acids, it tends to gel readily and is used for wrinkle finishes. For unwrinkled or smooth finishes the tung oil modifier is used in admixture with oil acids or less reactivity and there is obtained, thereby, an improvement in color and smoothness.

The wrinkling, checking and shrinkage which is present in the ordinary use of tung oil, oiticica oil, linseed oil alkyd combinations, is reduced by blocking the hydroxyl groups which usually react under heat to evolve water and which introduces further unsaturation reactive with atmospheric oxygen in the ultimate film.

Although the short oil alkyd resin starting materials used in making the epoxy alkyd component of the invention have been generally characterized in terms of known commercially available materials, and these do include such materials as the non-oxidizing Rezyl resins, 50–5, 99–5, 99–4–60, and the oxidizing Rezyl resins 387–5, 310–5, etc. which are furnished by the American Cyanamid Company, it has been found that the starting material is desirably substantially free from unreacted glycerine which serves to contaminate the ultimate product and which prevents the desired elimination of hydrogen halide in the dehydrohalogenation reaction.

When semi-drying soy bean oil acids are used in medium or short oil alkyds chemically modified in accordance with the invention, the film is slower air-drying and requires longer baking than tung oil but it has good flow and leveling properties immediately after application.

Exterior durability for architectural finishes and greater flexibility is improved by increasing the oil lengths from the short oil length towards the medium oil length in the epoxy product. However, if the oil acids are from linseed, the yellowing property may persist to render the alkyd unsuitable for pure white finishes and mixtures of saturated and unsaturated fatty acids are used.

Replacing part of the glycerol with pentaerythritol increases durability but makes the processing control more difficult, and makes it difficult to produce reproducible batches essential in commercial practice. Only a relatively small part of glycerol is replaced.

Accordingly, the starting short oil modified alkyd resin is carefully dried to remove moisture, and freed from alcohol including glycerol. If glycerol is present it is removed by known processes of extraction using non-alcoholic inert solvents, such as xylol, petroleum solvents and the like to ensure proper anhydrous conditions for the condensation with epihalohydrin in the addition reaction.

The starting alkyds are characterized by the high hydroxyl (OH) values and low acid values. The following values indicate preferred values for the starting material:

| Percent fatty acid | Acid number | Hydroxyl number | Type of fatty acid |
| --- | --- | --- | --- |
| 15–50 | 1–60 | 20–110 | Hydroxy fatty acid or oil. |
| 20–45 | 1–60 | 30–100 | Saturated fatty acid or oil. |

Up to 50% castor oil acids and up to 40% of saturated or unsaturated acid without the hydroxyl function provides at least 2 or more hydroxyl groups in the molecule and can be made to have a hydroxyl number of up to 100 to 110, uncorrected for free glycerol. By extracting glycerol, the hydroxyl number drops about 5 to 10 points. The glycerol-free starting alkyd has a hydroxyl number which ranges from 20–90 with an acid number of 1–20.

Epoxy cross-linking catalysts suitable for use in converting the short oil modified epoxy alkyd resin of the invention to the thermoset state include alkalies, alkaline reacting substances, acids, alkaline reacting salts, basic nitrogen compounds, and the like such as sodium hydroxide, potassium hydroxide, calcium oxide, ammonia; alkali phenoxides like sodium phenoxides; carboxylic acids or anhydrides such as formic acid, oxalic acid or phthalic anhydride; Friedel-Crafts metal halides like aluminum chloride, zinc chloride, ferric chloride, or boron trifluoride, as well as complexes thereof with ethers, ketones, diazonium salts, etc.; phosphoric acid and partial esters thereof including n-butyl orthophosphate, diethyl orthophosphate and hexaethyl tetraphosphate; and amino compounds such as dimethyl amine, trimethyl amine, triethyl amine, ethylene diamine, diethyl amine, diethylene triamine, triethylene tetramine, dimethyl amino methyl phenol, pyridine, piperidine, N,N'-diethyl-1.3-propanediamine, dicyandiamide and its formaldehyde condensation products, melamine and its formaldehyde condensation products, fatty acid salts of amines and the like. The amounts vary considerably depending upon the particular agent employed. For the alkalies or phenoxides, 2 to 4% is suitable. With phosphoric acid and esters thereof, good results are obtained with 2 to 7 percent added. The amino compounds are used in amounts of about 5 to 15 percent and the others in general involve addition of about 1 to 20 percent. As little as 0.25 percent of potassium hydroxide, or an equivalent amount of dimethylaminomethyl phenol, 0.675 percent; or of triethylamine, 0.45 percent, or of trimethylamine, 0.26 percent is effective for accelerating the reaction.

The cured resinous oil modified epoxy alkyd conjoint ethylenic polymer products are also of value in the preparation of hard infusible coating compositions when combined with other curing agents, under anhydrous conditions, such as the diisocyanates, urea-formaldehyde resins, dialdehydes or polycarboxylic acids.

Upon the addition of the curing or hardening agent, the composition may begin to cure and harden even at ordinary temperature.

A further use of the oil modified epoxy polyether alkyd resins lies in formulations with conventional epoxy resins, including the epoxy resins which are modified with one or more of the urea resins, phenolic resins, melamine resins, etc. Also, new and useful mixtures are obtained with acid esterified epoxy resins, and the styrenated epoxy resins.

As adhesives, these mixed resin formulations can include a conventional liquid epoxy resin, such as Epon 582 having an epoxy equivalent of 190–210 or Epon 562 having an epoxy equivalent of 140–165 (Shell Chemical Company), as the polymerizable carrier for a significant amount (25–60%) of the oil modified epoxy polyether alkyd of the present invention. These Epon resins 562 and 582 are the epichlorhydrin condensation products of glycerol, epoxidized by removing HCl.

If the epoxide curing agent is added to the epoxy polyether of the oil modified alkyd resin just prior to its application as a coating material dissolved in a polymerizable solvent, or as a laminating adhesive with a high resins content and low volatiles content, such resin composition as a polymerizable composition provides valuable advantages in the great variety of useful application techniques which are available as a result of the reactivity of the resin mixture.

Higher concentrations of the active polymerizable resin composition are available in the polymerizable solvent dispersion, at lower viscosity, before cure, thereby permitting precise control of the amount of resin required of the particular use. This results in improved adhesion to the base which is coated, without the disadvantage of lowered water, alkali and acid resistance in the conventional alkyd having unblocked hydroxyl groups.

Certain resins which are incompatible with conventional epoxy resins (the condensation polymers from 4,4' dihydroxy diphenyl methyl methane and epichlorhydrin, the so-called epoxy or Epon resins), have improved compatibility with the polymerizable epoxy alkyd resin mixtures of the present invention.

By blending the epoxy bisphenol resins with the liquid polymerizable epoxy polyether oil-modified alkyd resin mixtures in appropriate amounts, preferably before curing, there are obtained improved air drying and baking coatings. Improved compatibility is also exhibited with nitrocellulose (½ second), ethyl cellulose, polyvinyl acetate-chloride resins, ester gum and maleic ester gum. The compatibility is even better before curing, and such compatibility cannot be attained with the bisphenol epoxy or Epon resins. There is improved compatibility with the conventional medium and long oil alkyd resins, the styrenated alkyd resins and the rosin modified phenolic resins, than is observed with the conventional bisphenol epoxy resins. With these latter alkyd types, both nitrocellulose and amine resins may be added to make superior baking finishes for metal coatings, such as automobile lacquers.

Upon introducing the curing agent in the mixed epoxy resins just mentioned, a wide variety of polymerizable laminating and casting adhesive formulations are made available. The advantages of good chemical resistance, high flexibility, good adhesion and good color are either maintained or improved with respect to one or more of these properties, depending upon the proportions employed, and the specific materials being bonded.

For the bonding of molded or cast resin pieces particularly, such mixed adhesive compositions provide beneficial results. In the fabrication of coaxial high frequency transmission lines, these compositions as adhesives or castings may be employed to good advantage in assembling low impedance metal to plastic joints.

However, the epoxy oil modified alkyd resin component need not have too low an acid number. Acid numbers may be as high as 50–60 and oil modified aliphatic polyesters may be employed as the starting material for preparing the epoxy polyether product, but the free alcohol glycol or glycerine content is preferably kept at a minimum, in order to reduce the chlorine content of the product.

The mixed polymers and copolymers are obtained by employing peroxide or ammonium persulphate catalysts, in a small amount of about 1–20 parts per 1000 parts of mixture. The peroxide catalysts include hydrogen peroxide, benzoyl peroxide, phthalic peroxide, tertiary butyl peroxide, acetyl peroxide, lauroyl peroxide, alkyl hydro peroxides and cyclo alkyl hydro peroxides such as 1 hydroxy cyclohexyl hyperoxide-1, tertiary butyl hydro peroxide, etc.

In general, there is dissolved from about 1 to 20 parts of the oil modified epoxy polyether alkyd resin in about 20 parts of the vinyl or allyl monomer, a small amount of the epoxy curing catalyst is added to cross-link the alkyd resin and the monomer compositions. The monomers may also be used in mixture with each other as comonomers. The epoxy catalyst tends to stabilize the peroxide catalyst producing less decomposition than is found in the usual polyester-vinyl monomer peroxide polymerization, as evidenced by improved color.

As a casting, laminating or adhesive resin, and employing conventional bulk polymerization techniques, it is desirable to employ low polymerization temperatures, for example about 40° C. for vinyl acetate, 80° C. for styrene, 60° C. for methyl methacrylate, 45° C. for diallyl cyanamide, 70° C. for diallyl phthalate and diallyl maleate, etc. and to provide efficient jacketed cooling about the mold or impregnated fabric lay up to prevent overheating and bubble formation.

In casting operations the more exothermic polymerizing monomers may be cast in thinner sections in order to provide better temperature control and multiple casting or coating operations may provide a more uniform product. Ultra-violet light as well as heat accelerates polymerization. Infra red as well as ultra-violet lamps may be used in laminating operations. To exclude atmospheric oxygen, a sheet of heavily plasticized cellophane may serve to cover a fibrous sheet material which is impregnated with the comonomers in solution of the epoxy alkyd resin, vinyl or allyl monomer and catalysts. Superimposed sheets of paper, cloth, glass fibers, nylon, etc. may be bonded at low pressure by such techniques.

Before the copolymerization is complete it may be convenient to add a soluble drier, such as napthenate of cobalt, manganese, chromium, copper, nickel, cadmium or lead or mixtures of these. The drier may suitably be added during laminating operations at any time before the resin mixture has polymerized to a tacky gel stage or even just short of the infusible state, with an improvement of the cure obtained throughout the cross-section of the laminated or cast resin material.

Since some of the amines used as the curing agent for the epoxy oil modified alkyd resin act as inhibitors for the copolymerization of said alkyd and also inhibit the polymerization of the allyl or vinyl monomer, the inhibiting type curing agent for cross-linking the epoxy alkyd resin is added to cross-link the alkyd before said alkyd is dissolved in the monomer. The curing agent may then be washed out of the cured alkyd to remove inhibitor before being introduced into the peroxide catalyzed polymerization mixture. In certain cases, an excess of peroxide catalyst is effective to overcome the inhibiting effect of certain amine catalysts. A third alternative is to employ an acidic catalyst, such as borontrifluoride or the ethyl ether complex thereof, which has little inhibiting effect against the peroxide catalyzed polymerization.

An additional accelerator for the catalyst may be employed which overcomes the inhibiting effect of the amine in the presence of the peroxide catalyst; such an accelerator is azoisobutyronitrile (2,2'-bis-azoisobutyronitrile) which accelerates polymerization through a free radical mechanism of the ethylenically unsaturated grouping of the monomer or comonomer.

In bulk copolymerization processes, it is often convenient to separate, as by filtration, centrifuging or by solvent extraction the lower undesirable polymeric material from the more highly polymerized products and these may be recovered in a form suitable for molding.

Solvent polymerization has the advantage over bulk polymerization in that more uniform products in a higher state of polymerization are obtained. Such solvents as benzene, xylene, chlorbenzene, dichlorbenzene, methyl ethyl ketone, etc. may be used as the inert reaction medium for such polymerization, care being taken to exclude moisture, air and dissolved oxygen in the original reactants.

The polymerization reaction is conveniently carried out under an inert gas such as carbon dioxide or nitrogen, the gas being passed over the surface to sweep the reaction mixture free from oxygen or being bubbled through the liquid reactants. Otherwise the color of the product may be darkened in an undesirable manner.

The epoxy aliphatic alkyd resins preferred are those derived from the low molecular weight aliphatic polycarboxylic acids (maleic, fumaric, succinic, adipic, citric, carballylic, citraconic acids) and from an alkylene glycol having 1 to 4 carbon atoms in the chain or glycerol. The acid number may be as high as 50–60 but lower acid numbers, less than 20 (5–15) have better resistance to alkali, acids and water are therefore preferred.

Mixed epoxy polyether aliphatic polyesters may be employed; 20% lauric acid modified ethylene glycol adipic ester, 20% stearic acid modified glycol fumaric ester and 15% ricinoleic acid modified glycol maleic ester can be converted into the epoxy products by the same procedure as set forth in the above example to form emulsifiable products useful in coating and textile finishing applications. The polyester starting materials for these products suitably have an acid number of less than 5 and a hydroxyl number of about 40–60.

However, if a higher acid number is used, up to 25 or 30, the epoxy products which are polymerizable with peroxide catalysts have improved compatibility for polyvinyl alcohol, and nitrocellulose when dissolved in a vinyl or allyl monomer, such as styrene, vinyl acetates or diallyl phthalate, and polymerized. This last named polymerization can be effected in bulk, in a solvent or by dispersing the ingredients in a persulphate peroxide catalyzed aqueous suspending medium, in which additional emulsifiers and wetting agents serve to control the uniformity of polymerization, the degree of polymerization and the particle size of the latex particles or of beads which are produced.

As the proportion of aliphatic polycarboxylic acid increases in the oil modified polyester, the products become more flexible and rubbery and somewhat lower melting during the fusible stage before introducing epoxy group.

If it is desired to further augment the flexible character of the resin, one may do so by blending the resin solutions with polyamides from ethylene diamine and dimerized unsaturated fatty acids, or butadiene styrene polymer latices, a preferred example of the latter is a latex containing high styrene (about 65%) to low butadiene (about 35%) polymerized in the presence of persulphate and anionic emulsifiers in an alkaline aqueous medium. The latex combination compatible with many of the standard rubber base latex paints confers improved properties to these particularly as a result of the benefits contributed by the epoxy modified oil modified alkyd of the present invention.

By adding an amine curing agent, such as triethylene tetramine, and pigment to the conjoint polymer mixture in a solvent, good baking lacquers dilutable with butanol, chlorbenzene and the like are obtained which have good resistance to temperatures of about 100–110° C. Such lacquers may be blended with styrenated bodied linseed oil, or bodied oil modified alkyd resins as shown in U.S. 2,586,092, to form water paints of good gloss, or a butanol solution of 40% butylated melamine formaldehyde resin or butylated urea resin.

Also, titanium esters may be added, such as basic tetravalent titanium acylates as disclosed in Lang-Kammerer, U.S. 2,489,651, or esters of titanium such as the tetrabutyl ester where improved heat resistance and corrosion resistance are desirable.

In order that those skilled in the art may better understand how the present invention can be carried into effect, the following examples are given by way of illustration and not by way of limitation. All parts and percentages are by weight.

EXAMPLE 1

*Preparation of polyether polyepoxide oil modified alkyd resin*

(A) REACTION OF ALKYD WITH EPICHLORHYDRIN
(SnCl₄ CATALYST)

To a glass reaction vessel equipped with a stirrer, reflux condenser, thermometer and drying tubes at all outlets, and chilled with an ice-salt mixture, the following were added in the order named:

| | Parts |
|---|---|
| 52.4% alkyd in anhydrous xylol (anhydrous short oil alkyd from 2 moles of lauric acid and 5 moles phthalic acid anhydride and 4 moles of glycerol containing 47% phthalic acid anhydride, 33% fatty acid and about 20% glyceryl residue acid value 5.5) | 429.8 |
| Epichlorhydrin (98% purity Shell Chemical Co.) | 23.6 |
| Anhydrous SnCl₄ in anhydrous xylol (20% solution) | 1.31 |

At 2° C., the epichlorhydrin was added to the alkyd dissolved in xylol, and the SnCl₄ in xylol was added dropwise with stirring over a 10 minute period. The temperature rose and the reaction mixture was warmed first to 30° C., with stirring and then to 90° C. The reaction was continued for ½ hour, the temperature rising to 180° C. The SnCl₄ excess was decomposed with 1.1 parts of sodium carbonate, the mixture stirred an additional 10 minutes and then filtered over a Celite mat to remove decomposed xylol-insoluble matter including catalyst. Xylol was removed under vacuum. 77.5 parts of the starting alkyd were converted into 83.3 parts of the xylol-free epichlorhydrin reaction product having an acid number of 5.2. This indicates the addition of 5.8 parts of epichlorhydrin whereas the addition of 7.9 parts is the theoretical yield. Percent Cl=2.0% (56.3% resin in xylol). Viscosity Z–1 Gardner scale, starting viscosity Z–3.

(B) DEHYDROHALOGENATION OF THE CHLOROHYDRIN ADDITION PRODUCT (Sodium aluminate catalyst) to form epoxy alkyd: Sodium aluminate, Nalco 680, from the National Aluminate Corporation having the following composition:

| | Percent | Mols |
|---|---|---|
| Na₂Al₂O | 72 | 0.439 |
| NaOH | 5.3 | 0.132 |
| H₂O (by difference) | 22.7 | 1.26 |
| | 100.0 | | was heated in a Coors crucible over a Mekker burner. Ignition was continued for an hour. The weight loss was 22.0%. The material was pulverized and stored in a desiccator.

To a 3 necked flask were added 60 parts of 56% solution of the product from A in xylol. After addition of 20 parts by volume of dioxane, the solution was chilled to about 32° F. 1.8 parts of catalyst ("Nalco 680 Dried") were ground in about 15 parts of dioxane and the pulverized catalyst was washed into the chilled flask with vigorous stirring. Three drops of water were added (approximately 0.17 part) to the stirred mixture and the temperature rose from 32° F. to 38° F. With constant stirring the contents of the flask were heated between 198° F. and 210° F. for a period of 1½ hours, at which time heating was discontinued.

The clear solution was separated from the precipitate present by suction filtration through a Büchner funnel using a Celite mat. Using pH papers (moistened with water) the pH was found to be in the range 6 to 7. To free the epoxy alkyd as the alkyd acid (instead of the sodium salt of the alkyd), a portion of $AlCl_3$ was added to the stirred xylol-dioxane solution of epoxy alkyd followed by 5 drops of water. After stirring for 15 minutes, the solution was dried with anhydrous sodium sulphate and suction filtered with the aid of a Büchner funnel and Celite mat. As the pH was about 5, two drops of propylene oxide were added to take up any free HCl present due to $AlCl_3$ and $H_2O$, and the pH rose to between 6 and 7.

The material was freed from xylol under vacuum (water aspirator pump) with most of the distillate coming over in the range 31° C. to 40° C. at a bath temperature of 68° C. to 87° C. The pH of the vacuum distillation residue, epoxy alkyd was between 5 and 5.5.

The quantity of the vacuum distillation residue, the epoxy alkyd, was 48.6 parts, which at 59.2% solids, corresponds to 28.8 parts of 100% solid resins. About 2% of the original solution was lost as chloride during the dehydrohalogenation. In 60 parts of starting material at 56% solids we have 33.6 parts of 100% resin, from which 1.2 parts is lost as HCl, leaving 32.4 parts as the theoretical quantity of product to be expected. Thus the yield is: 89% yield. The epoxy resin product gelled at room temperature upon treatment with an amine curing catalyst, triethylene tetramine, in an amount of about 5% by weight of the product. The epoxy resin product has an epoxide value of 1060 and at an average molecular weight of 1500-2500 the number of epoxy groups per molecule vary from 1.6 to about 2.6. A substitution with as little as ½ epoxy groups to 1.6 produces beneficial curing effects along the lines as set forth in this example.

EXAMPLE 2

Example 1 was repeated except that the starting alkyd resin before reaction with epichlorhydrin was extracted to free it from glycerol in accordance with the method of Wright and Du Puis; in the article "Paint Manufacturer," November 1945, pages 76-80. Methanol or ethanol were used as the solvents in successive runs with equally good results.

After solvent extraction the residual glycerol-free alkyd material was taken up in an inert anhydrous higher boiling solvent such as xylol, and the alcohol removed from the solvent solution to provide an anhydrous alcohol-free solution of the glycerol-free alkyd in a condition suitable for the addition condensation with epichlorhydrin using the Friedel-Crafts catalyst, $SnCl_4$. About 6% (5.5%-6.3% in various runs) of glycerol as free glycerol is removed and about 45-50% of extractable material was removed by the extraction of the alkyd.

Repeating the epichlorhydrin condensation process and using the same relative amounts as set forth in Example 1, the recovered addition product (percent Cl=1.8%) was subjected to the dehydrohalogenation treatment as set forth in Example 1 and the epoxy alkyd recovered was free from chlorine, lighter in color and showed better stability than the product of Example 1.

Equally good results in the example above are obtained in the epichlorhydrin addition reaction when anhydrous zinc chloride is used as the Friedel-Crafts catalyst. Other catalysts may also be used such as boron trifluoride and ferric chloride. The temperature of the addition condensation may be suitably varied from 75 to 125° C. but a temperature range of 90-115° C. is preferred.

In the dehydrohalogenation reaction instead of sodium aluminate, or potassium aluminate, anhydrous sodium or potassium zincate and somewhat less effectively, anhydrous sodium ortho and meta silicates may be used. The temperature of dehydrohalogenation is usually of the order of 75-105° C.

EXAMPLE 3

A 35% soya-bean medium oil alkyd was prepared by heating together soya-bean oil acids, phthalic acid anhydride and (5% excess) glycerol, in the required amounts at 180° C. for 1 hour, as 235° C. for 1 hour and was held at 235° C. until the acid number was 12 at which time the resin was poured.

The resin was extracted to remove free glycerol as in Example 2 taken up in xylol, freed from alcohol and reacted first with epichlorhydrin and then with sodium aluminate as in Example 1. The hydroxyl number of the starting alkyd was about 90 and the acid number was about 12.

EXAMPLE 4

Using the procedure of Example 3 a 30% linseed oil modified alkyd was made having an acid number of about 14 and after extraction to remove free glycerol, the hydroxyl number was about 97 and the acid number 13. The anhydrous alcohol free alkyd condensed with epichlorhydrin and dehydrohalogenated provided good air drying films (same drier as Example 3) and good baked films. The film was yellower than the film of Example 1.

The alkyds of Examples 1-4 provide good air drying films when from 10-15% of the starting glycerol is substituted with pentaerythritol or with diethylene glycol but the viscosities of these alkyds were somewhat higher with pentaerythritol. By permitting the acid numbers to rise between 15 and 20, the viscosity was reduced somewhat in the pentaerythritol modified alkyds.

EXAMPLE 5

A glycerol-free alkyd from ricinoleic acid having an acid number of 5, and a hydroxyl number of 105 was converted to the epoxy alkyd by the method of claim 1 and produced an epoxy product highly reactive with the amine crosslinking catalyst of Example 1 which in turn provided good films, comparable to those of Examples 1-4.

EXAMPLE 6

A starting alkyd from 90% phthalic acid anhydride, 10% adipic acid and ethylene glycol modified with 20% lauric acid and heated for a sufficient period of time to have an acid number of about 9 and a flow point of about 65° C. is condensed with epichlorhydrin and dehydrohalogenated in accordance with the procedure set forth in Example 1.

EXAMPLE 7

The polyether polyepoxide of lauric acid modified glycol maleic acid ester, ½ mole of the anhydrous extracted polyester in a 50% solution by weight in anhydrous xylol, having a hydroxyl value of 45 and an acid value of 3, containing about 20% of fatty acid, is prepared according to the extraction method of Example 2 and the combined addition and dehydrohalogenation method of Example 1. This method was likewise followed to produce the polyether polyepoxides of lauric acid modified glycol fumaric acid polyester, lauric acid modified glycol adipic acid polyester, mixed polyesters of the oil modified glycol fumaric polyesters with those of the maleic, adipic, phthalic and succinic linear polyesters. The flexibility, hardness after cure and heat stability of the mixed polyesters containing fumaric acid and/or phthalic polyesters is better than the linear maleic acid polyester. About 20% of the lauric fatty acid was found suitable to impart beneficial oil compatibility properties and was used in all of the preparations of the examples.

EXAMPLE 8

A solution of 50 parts of chlorbenzene, 20 parts the polyether polyepoxide of Example 1 and 5 parts of monomeric diallyl phthalate is heated under rapid agitation in the presence of 0.5% ethylene diamine and 0.1% benzoyl peroxide at 75° C. to 80° C. for about ¾ hour, after which time the mixture thickened noticeably. Heating under agitation was continued an additional 1 hour to provide a smooth gelled dispersion useful as an adhesive after removing the solvent for bonding paper sheets, glass fiber sheets or birch veneer sheets under a pressure of 100 to 150 pounds per square inch at temperatures from 110° C. to 140° C. for ¼ to ½ an hour.

Using the polyether polyepoxides of Examples 3–7, inclusive, similarly smooth gelled mixtures were well dispersed in the solvent.

Instead of using the mixture as an adhesive, it can be heated an additional hour in the presence of additional epoxy catalyst, such as triethylamine tetramine in an amount of 1% by weight of the resin, which produces a more infusible resinous product to which pigment, modifiers such as butylated urea formaldehyde or butylated melamine formaldehyde (40%), and butanol may be added to provide a good baking finish. The amount of modifier is preferably from 10 to 30% by weight of the resin in the gelled mixture. The viscosity is reduced by thinning with xylol and heating while thinning the dispersion under agitation to provide a smooth blend.

EXAMPLE 9

Example 8 was repeated using 10 parts of the polyepoxide of maleic polyester as in Example 7 and 5 parts of styrene. However the epoxy curing catalyst was added first and the mixture heated to 60° C. for ¾ hour after which the peroxide catalyst was added and the mixture heated an additional 1½ hours. The product was softer and more flexible than the phthalic alkyd-containing products of Example 8.

EXAMPLE 10

Example 9 was repeated except that the solvent was omitted and diallyl cyanamide was substituted for styrene and in place of benzoyl peroxide 1.5 parts of azoisobutyronitrile was used as the polymerization catalyst. The polyether polyepoxide, the epoxy curing catalyst of Example 9 with diallyl cyanamide and the azoisobutyronitrile were charged in a sealed tube, heated for 36 hours in a closed container at 75° C. and a viscous adhesive polymeric liquid product produced which could be further hardened to a solid by heating at 100° C. for a few hours. This product is suitable as a coating or a laminating adhesive and is fire resistant.

EXAMPLE 11

Example 10 was repeated except that the combined catalysts of azoisobutyronitrile and the epoxy curing catalyst (the amine) were replaced by a single catalyst, baron trifluoride etherate, in an amount of 2 parts by weight of the combined weight of the polymerizable resins. The mixture was cooled to 0° C. before adding the catalyst and the mixture polymerized at 10° C. for 90 hours in a sealed tube which was agitated to ensure thorough and uniform reaction of the products with the catalyst. The product was washed with water, dilute alkali and dried and was found suitable for coating applications.

If the styrene containing product of Example 9 is modified by replacing 10% of the styrene with divinylbenzene a product may be recovered by pouring the solution into a non-solvent to precipitate a granulated insoluble somewhat porous product, which displays cation exchange properties.

It will be understood, of course, by those skilled in the art that the invention is not limited to the particular comonomers named in the above illustrative examples, nor to the particular proportions thereof, nor to the particular methods of copolymerization given therein. Thus, instead of the specific polymerization catalysts specified in the individual examples, any other polymerization catalyst, numerous examples of which have been mentioned hereinbefore, can be employed. Depending upon the particular properties desired in the copolymer composition and the specific use intended for the composition, the comonomer can be varied as desired or as conditions may require so long as it contains one or more of the polyether polyepoxides and compounds having $CH_2=C=$ groupings, but no conjugated C to C double bonds.

I claim:

1. A polymerizable composition adapted to be cured in the presence of an epoxy curing catalyst containing (1) a polymerizable polyether polyepoxide oil modified alkyd resin prepared by the dehydrohalogenation of an epihalohydrin addition product of a short to medium oil modified alkyd resin having from 8 to 20 carbon atoms in the fatty acid molecule, an acid number below 60, and sufficient free hydroxyl groups to provide about ½ to 2½ epoxy groups in each molecule of said epihalohydrin ether, said ether epoxide oil modified alkyd having an ether oxygen atom attached to adjacent carbon atoms forming the cyclic structure and at least two of said epoxide groups being linked in an ether linkage to a hydroxyl group in said alkyd resin molecule and (2) a polymerizable monomeric compound which forms a mixed polymer with (1), which compound contains at least one $CH_2=C=$ grouping, but having no conjugated C to C double bonds.

2. A polymerizable composition adapted to be cured in the presence of an epoxy curing catalyst containing (1) a polymerizable polyether polyepoxide oil modified alkyd resin prepared by the dehydrohalogenation of an epihalohydrin addition product of a short to medium oil modified alkyd resin having from 8 to 20 carbon atoms in the fatty acid molecule, an acid number below 60, and sufficient free hydroxyl groups to provide about ½ to 2½ epoxy groups in each molecule of said epihalohydrin ether, said ether epoxide oil modified alkyd having an ether oxygen atom attached to adjacent carbon atoms forming the cyclic structure and at least two of said epoxide groups being linked in an ether linkage to a hydroxyl group in said alkyd resin molecule and (2) a polymerizable monomeric compound which forms a mixed polymer with (1), which compound contains at least one $CH_2=C=$ grouping, but having no conjugated C to C double bonds, and an effective amount of a polymerization catalyst to polymerize said named monomeric compound.

3. A polymerizable composition as claimed in claim 2 wherein said polymerization catalyst is a peroxide catalyst.

4. A polymerizable composition as claimed in claim 2 wherein said polymerization catalyst is azoisobutyronitrile.

5. A polymerizable composition as claimed in claim 2 wherein said polymerization catalyst is boron trifluoride trietherate which serves as a polymerization catalyst for both component (1) and component (2).

6. A composition as claimed in claim 1 modified with from 5 to 30% of an amine-aldehyde resin selected from the class consisting of urea-formaldehyde resins and melamineformaldehyde resins.

7. A composition as claimed in claim 1 modified with from 5 to 30% of a liquid resinous glycidyl polyether of epichlorhydrin.

8. A composition as in claim 1 wherein the alkyd resin is prepared from fumaric acid and ethylene glycol and is modified with about 20% of lauric acid.

9. A composition as in claim 1 wherein the alkyd resin is prepared from fumaric acid, adipic acid and ethylene glycol and is modified with about 20% of lauric acid.

10. A composition as in claim 1 wherein the alkyd resin is prepared from fumaric acid and phthalic acid and is modified with about 20% of lauric acid.

11. A composition as claimed in claim 1 wherein said component (2) is diallyl phthalate.

12. A composition as claimed in claim 1 wherein said component (2) is diallyl cyanamide.

13. A composition as claimed in claim 1 wherein said component (2) is styrene.

14. A composition as claimed in claim 1 wherein said component (2) is an alkyl ester of an acrylic acid.

15. A composition as in claim 1 containing an epoxide curing catalyst in an amount of from 0.5 to 5% of the weight of components (1) and (2).

16. A composition as in claim 15 wherein said catalyst is dicyandiamide.

17. A composition as in claim 15 wherein said catalyst is melamine.

18. A composition as in claim 15 wherein said catalyst is an aliphatic amine.

References Cited in the file of this patent
UNITED STATES PATENTS

| | | |
|---|---|---|
| 2,581,464 | Zech | Jan. 8, 1952 |
| 2,599,799 | Wittcoff | June 10, 1952 |
| 2,720,500 | Cody | Oct. 11, 1955 |